UNITED STATES PATENT OFFICE.

AUGUST F. W. PARTZ, OF OAKLAND, CALIFORNIA.

IMPROVEMENT IN COMPACTING SUGAR INTO BLOCKS.

Specification forming part of Letters Patent No. 133,884, dated December 10, 1872; reissue No. 6,209, dated January 5, 1875; application filed September 24, 1874.

DIVISION B.

*To all whom it may concern:*

Be it known that I, AUGUST F. W. PARTZ, of Oakland, in the county of Alameda and State of California, have invented a new and Improved Mode of Compacting Granular Sugar, of which the following is a specification:

In the manufacture of sugar in solid cubes or blocks from loose granular sugar, as obtained from a centrifugal machine, the granular sugar, while still in a moist state, is compacted in molds and subsequently dried. The compacting of the sugar has heretofore been effected by means of platen-presses having an up-and-down motion. The use of such presses for that purpose necessitates a moderate speed, and they must be built so as to be capable of exerting a powerful pressure, because the resistance to be overcome in compressing a layer of loose, moist sugar confined between two flat surfaces is very great; and this is owing, in a considerable degree, to the circumstance that the air contained in the interstices between the sugar-crystals has but little chance to escape, and has therefore mostly to be compressed in proportion as the bulk of the sugar is reduced. In consequence thereof the air in expanding again, when the pressure is removed, more or less reloosens the sugar.

My invention is intended to render the compacting of granular sugar more expeditious, economic, and thorough than it has hitherto been; and it consists in effecting the compression of the loose sugar deposited in molds, by means of a roller or rollers, in a continuous and progressive operation, which admits of a high rate of speed, and requires a far less exertion of power than is needed when the work is performed by a platen-press, because the full available pressure is temporarily confined to a small area, and the air contained in the sugar is in great measure permitted to escape.

The mode of operation is substantially as follows: The sugar to be compacted, coming fresh from a centrifugal machine, and being still moist and warm, is placed in suitable molds, so as to form an even layer rising sufficiently above the molds to insure the desired density of the sugar when it is compressed. The molds are then passed in close succession upon a proper support under a horizontal roller which turns in stationary bearings, or they are passed between two rollers situated one above the other, and in either case the sugar is compressed so as to form cubes, blocks, or cakes according to the shape of the molds.

Having thus described my invention, what I claim, and desire to secure by Letters Patent, is—

The process above described of compacting loose granular sugar in independent molds by passing the molds with the sugar between pressing-rollers.

AUGUST F. W. PARTZ.

Witnesses:

J. L. BOONE,

C. M. RICHARDSON.